(12) United States Patent
Mukherjee et al.

(10) Patent No.: US 7,756,348 B2
(45) Date of Patent: Jul. 13, 2010

(54) METHOD FOR DECOMPOSING A VIDEO SEQUENCE FRAME

(75) Inventors: Debargha Mukherjee, San Jose, CA (US); Sam Liu, Mountain View, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 926 days.

(21) Appl. No.: 11/589,447

(22) Filed: Oct. 30, 2006

(65) Prior Publication Data

US 2008/0101707 A1 May 1, 2008

(51) Int. Cl.
  *G06K 9/36* (2006.01)
  *H04N 5/14* (2006.01)
  *G06K 9/46* (2006.01)
(52) U.S. Cl. ..................... 382/236; 348/699
(58) Field of Classification Search ............... 382/164, 382/173, 218–220, 232, 233, 236, 239, 253; 375/240.01, 240.12, 240.14, 240.16, E7.105, 375/E7.111; 348/208.99, 452, 699
See application file for complete search history.

(56) References Cited

U.S. PATENT DOCUMENTS

| | | | | |
|---|---|---|---|---|
| 5,181,111 A | * | 1/1993 | Hedley et al. | 348/452 |
| 5,398,078 A | * | 3/1995 | Masuda et al. | 348/699 |
| 5,673,339 A | * | 9/1997 | Lee | 382/236 |
| 5,745,183 A | * | 4/1998 | Lam | 375/240.15 |
| 5,825,423 A | * | 10/1998 | Jung | 375/240.14 |
| 5,838,827 A | * | 11/1998 | Kobayashi et al. | 382/236 |
| 5,969,766 A | | 10/1999 | Kim | |
| 6,501,503 B2 | * | 12/2002 | Kudo | 348/208.99 |
| 6,940,907 B1 | | 9/2005 | Chen et al. | |
| 7,224,731 B2 | * | 5/2007 | Mehrotra | 375/240.16 |
| 7,352,905 B2 | * | 4/2008 | Mukerjee et al. | 382/236 |
| 2005/0053294 A1 | * | 3/2005 | Mukerjee et al. | 382/236 |
| 2008/0101707 A1 | * | 5/2008 | Mukherjee et al. | 382/236 |

FOREIGN PATENT DOCUMENTS

WO   WO2005006767   1/2005

OTHER PUBLICATIONS

Hung, E.M. et al., "On Macroblock Partition for Motion Compensation", downloaded Oct. 27, 2006.
Kondo, S. et al., "A Motion Compensation Technique Using Sliced Blocks and Its Application to Hybrid Video Coding", Visual Comm. and Image Processing 2005.
Mukherjee, D. et al., "Low Complexity Guaranteed Fit Compound Document Compression", IEEE ICIP 2002.

* cited by examiner

*Primary Examiner*—Amir Alavi

(57) ABSTRACT

In a method for decomposing a block of a video sequence frame, it is determined as to whether either or both of the dimensions of the block equals a predetermined minimum dimension. In response to either or both of the dimensions equaling the predetermined minimum dimension, a motion vector for the block is sent. In response to both of the dimensions exceeding the predetermined minimum dimension, a motion vector for the block is determined, the block is partitioned into two wedges, the block is divided into four N/2× N/2 sub-blocks, and these steps are repeated on each of the four N/2×N/2 sub-blocks until either or both of the dimensions equal the predetermined minimum dimension.

20 Claims, 9 Drawing Sheets

METHOD FOR DECOMPOSING A VIDEO SEQUENCE FRAME

BACKGROUND

Typically, temporal variations in video sequences occur due to camera or object motion. If compensation for this motion is available, improvement in the video image prediction sequences is also possible, with relatively compact motion information, which enables video compression algorithms to significantly reduce the amount of data needed to transmit the video sequences with an acceptable level of quality.

Under the international video coding standard H.264, MPEG-4 Part 10, or Advance Video Coding (AVC), the coding processes are performed using units of macroblocks of 16×16 pixels. In addition, motion compensation is typically performed by partitioning the macroblocks into square or rectangular sub-macroblocks in a quad-tree decomposition. In this motion compensation technique, each leaf level block of size N×N is associated with a different motion vector and coding mode. Moreover, the residual error is coded using an appropriate transform, followed by quantization and entropy coding.

Conventional techniques have yielded an improvement in the compensation of the camera or object motion over previous techniques. However, because the conventional quad-tree decomposition is restricted to macroblocks and sub-macroblocks of squares or rectangles, the shape of a macroblock typically does not correspond to the outline of the shape of the moving object. Because of the fixed shapes of the macroblocks and sub-macroblocks, in situations where the same macroblock includes several regions with different motion, the coding efficiency is substantially reduced.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to an exemplary embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

Disclosed herein are methods and systems for enhancing one or more metrics, such as, residual errors, rate-distortion efficiencies, etc. of video codecs. More particularly, the methods and systems disclosed herein employ techniques that not only partition macroblocks into sub-blocks, but also partitions the blocks into wedgelets, where appropriate. The wedgelets or wedges may be formed at any reasonably suitable and desired location in the blocks are relatively more efficient in representing edges in images, as compared with the blocks because they are not confined to vertical and horizontal lines. In addition, different motion compensation may be used for the different wedges in a particular block to more accurately compensate for movement in a block and thus enhance residual errors, rate-distortion efficiencies, etc.

Also disclosed herein are methods and systems for substantially reducing the computational complexity associated with partitioning the blocks. In other words, the methods and systems disclosed herein enable relatively fast and less computationally complex manners of selecting where the blocks are to be partitioned, while still providing for substantially minimized residual errors and/or substantially maximized rate-distortion efficiencies.

Figure 1A:
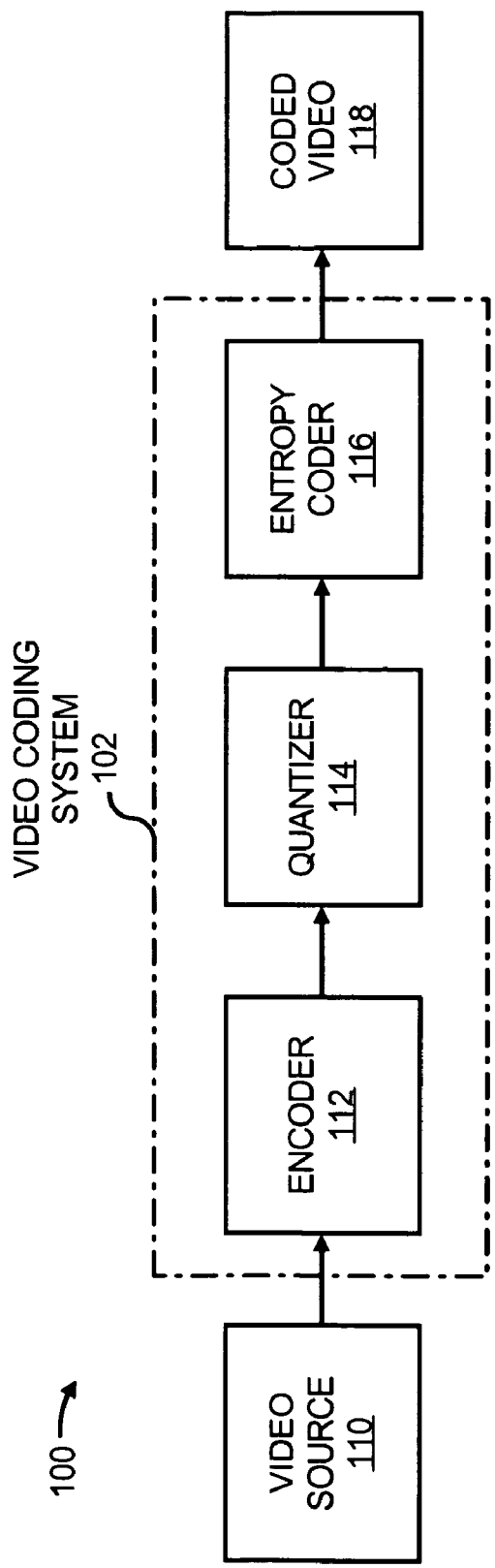
FIG. 1A is a simplified functional block diagram of a video coding system according to an embodiment of the invention.

With reference first to FIG. 1A, there is shown a simplified functional block diagram 100 of a video coding system 102, according to an example of the invention. Although particular reference has been made herein below to the video coding system 102 as including particular features, it should be understood that the video coding system 102 may include additional components and that some of the components described herein may be removed and/or modified without departing from a scope of the video coding system 102.

As shown in FIG. 1A, the video coding system 102 includes an encoder 112, a quantizer 114, and an entropy coder 116. In operation, the video coding system 102 receives video content from a video source 110. The video source 110 may comprise any reasonably suitable source, such as, a data storage device, a network, the Internet, a separate computing device, etc. In addition, the video content may comprise analog or digital video.

As described in greater detail herein below, the video coding system 102 generally performs various coding functions on the video content received from the video source 110 to thereby output a coded video 118. In one regard, the video coding system 102 may perform motion estimation or compensation operations on the video content. Generally speaking, motion estimation refers to a set of techniques used to extract the motion information from a video sequence. The MPEG standard represents motion information by providing one or two motion vectors per macroblock, depending upon the type of motion compensation; forward predicted, backward predicted, or average. In addition, motion estimation may include processes of finding optimal or substantially optimal motion vectors for the macroblocks.

By way of example, the encoder 112 may estimate motion in the video content from macroblocks in a current frame, sampled at a first time, with similarly sized macroblocks in a reference frame, sampled at a second time. The second sample time may be prior to the sample time of the current frame.

In estimating the motion in the video content, the encoder 112 may decompose the video content into sequential frames, and may further decompose the sequential frames into variously sized blocks and variously positioned wedges, as described in greater detail herein below with respect to FIG. 1B. The locations and sizes of the blocks and wedges may be based, for instance, upon the edges of objects contained in the frames. In addition, the encoder 112 may compute and code motion vectors and residual (prediction) errors for the variously sized blocks and variously positioned wedges. The encoder 112 may compute the motion vectors, which identify the relationship between the present macroblock and the previous, matched, macroblock. For example, a motion vector will identify the change in position of the pixels between a first macroblock and a second macroblock. In addition, each of the blocks and wedges may be associated with a different motion vector and coding mode.

The encoder 112 may also determine the residual errors obtained either after motion-based prediction from previously coded frames, or after intra-prediction from the already coded parts of the current frame. The residual errors may also be coded using an appropriate transform, followed by quantization and entropy coding. For the blocks that have been partitioned into wedges, a block-based transform that combines the wedges may be used, or a more appropriate, shape-adaptive transform for the individual wedges may be used to code the residual errors.

Generally speaking, motion vectors are values which, when added to the coordinates of any pixel in the matching macroblock, provide the coordinates of the current macroblock. Because the motion estimation procedure provides vectors on a macroblock basis, all further calculations that would otherwise be performed on a pixel by pixel basis are performed on a macroblock basis. Accordingly, this motion estimation method requires less computational power than other pixel-wise approximation techniques.

Figure 1B:
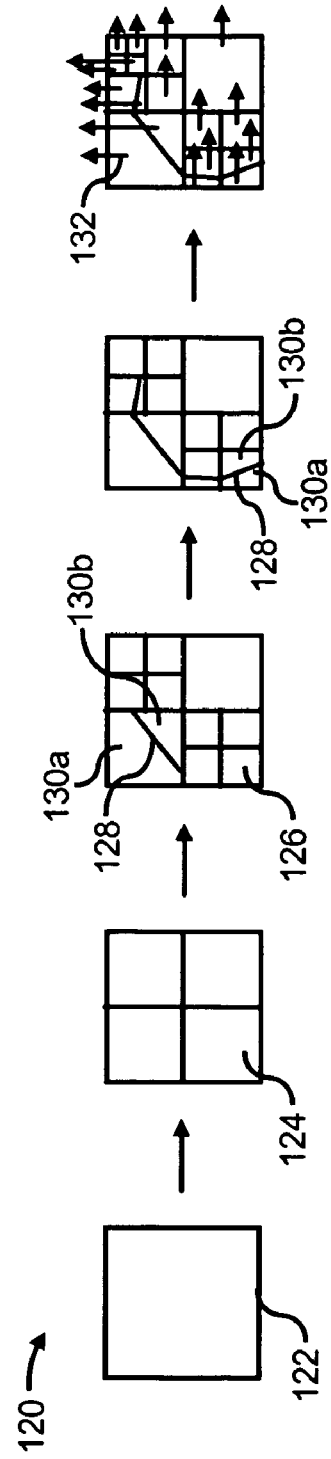
FIG. 1B is a functional block diagram of a manner in which an encoder may decompose a macroblock, according to an embodiment of the invention.

With particular reference now to FIG. 1B, there is illustrated a functional block diagram 120 of a manner in which the encoder 112 may decompose a macroblock 122, according to an example of the invention. It should be understood that the following description of the functional block diagram 120 is but one manner of a variety of different manners in which a macroblock 122 may be decomposed. In addition, it should be understood that the manner in which a macroblock 122 is decomposed may be dependent upon various characteristics of the pixels contained in the macroblock 122 and will thus vary on a macroblock 122 by macroblock 122 basis.

The encoder 112 may previously have decomposed the video content into a plurality of frames. In addition, the encoder 112 may previously have decomposed at least one of the plurality of frames into a plurality of macroblocks 112. The macroblocks 112 may comprise, for instance, 16×16 pixels each, as is standard in H.264, MPEG-4 Part 10, and AVC.

The encoder 112 may further decompose some or all of the macroblocks 122 into a set of 8×8 pixel sub-blocks 124. The encoder 112 may still further decompose some or all of the 8×8 pixel sub-blocks 124 into 4×4 pixel sub-blocks 126, as is known in quad-tree decomposition techniques. Generally speaking, the encoder 112 may determine which sections of which macroblocks 122 to further decompose based upon the outline shape of the moving object contained in the macroblock 122.

Traditionally, the macroblock 122 divisions have been limited to squares and rectangles, and thus, the shapes of the blocks 122-126 normally do not accurately correspond to the outline shape of the moving object. As such, if there are different sections within the same block 122-126 having different motion vectors, the coding efficiency is reduced.

According to an example, and as described in greater detail herein below, one or more of the blocks 122-126 may be further decomposed through use of wedgelets 130a and 130b, which form through insertion of a slice line 128 through a block 122-126, as shown in FIG. 1B. More particularly, the encoder 112 may employ a multi-scale wedgelet 130a, 130b framework towards more accurately capturing geometric structures in images, thereby improving the coding efficiency over traditional techniques. The wedges 130a, 130b are considered multi-scaled because they are insertable into any sized block 122-126.

Figure 1C:
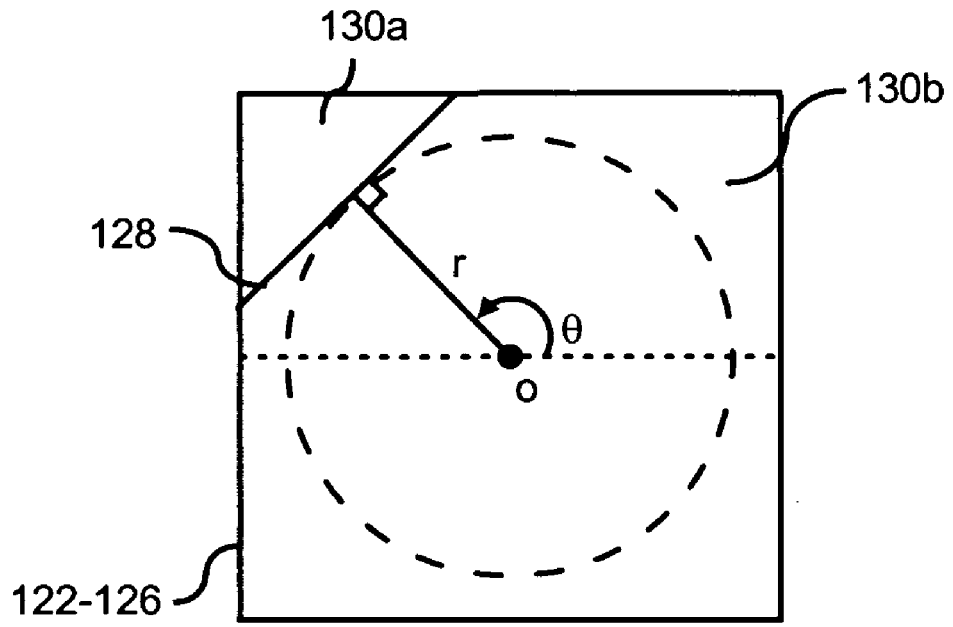
FIGS. 1C and 1D depict examples of a continuous wedge and a discrete wedge, according to embodiments of the invention.
Figure 1D:
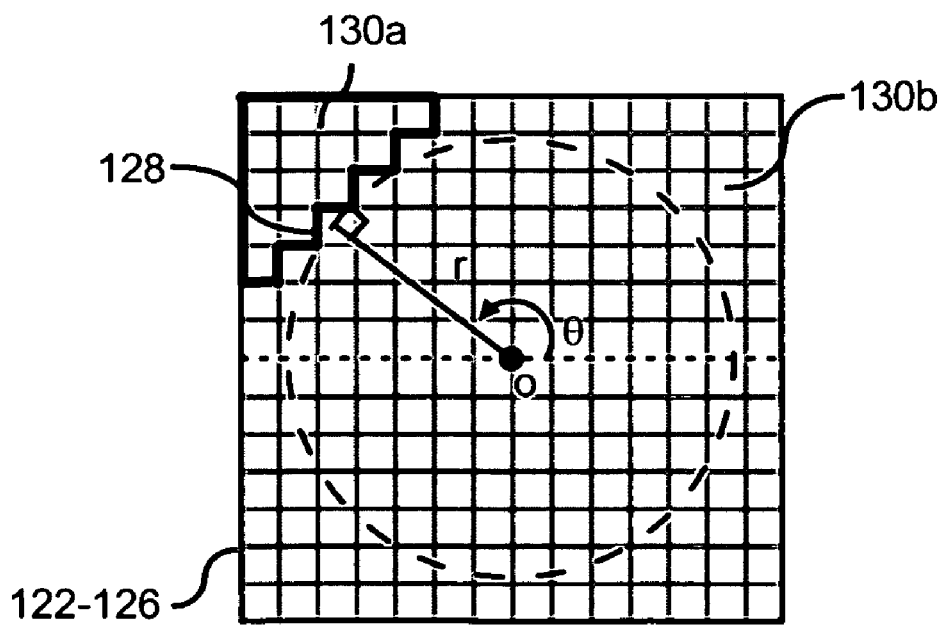

By way of example, the encoder 112 may insert wedges into an N×N block 122-126 by splitting the block 122-126 into two wedges 130a, 130b along a slice line 128. The slice line 128 may have an orientation angle θ and may be located a distance r from a center o of the block 122-126. Depictions of a block 122-126 having a slice line 128 and wedges 130a, 130b are provided in FIGS. 1C and 1D. The slice line 128 shown in FIG. 1C is continuous and the slice line 128 shown in FIG. 1D is discrete. For instance, the continuous slice line 128 depicted in FIG. 1C shows the actual location of the slice line 128 and the slice line 128 depicted in FIG. 1D depicts a discretized version of the slice line 128 based upon which side of a wedge 130a, 130b pixels located on the slice line 128 fall. The slice line 128 may be discretized for each of the pixels along the slice line 128 (FIG. 1C) by deciding which side of the pixel the slice line 128 is located. In situations where the slice line 128 is located directly in the center of a pixel, the slice line 128 may be located on either side of the pixel so long as the selection is consistent with a decoder.

The encoder 112 may position the slice line 128 such that it passes through any position in a block 122-126. The encoder 112 may generate the set of all wedge partitions 130a, 130b in an N×N block 122-126 by sampling the space of the orientation angle θ and the distance r at suitable intervals, yielding a dictionary of $N_w$ entries. The dictionary of $N_w$ entries may depend on design parameters, such as increment precision for the orientation angle θ and the distance r.

Ideally, all possible wedge 130a, 130b segmentations for all possible block combinations should be predicted to determine the best wedges 130a, 130b. However, because the number of partition strategies in a block 122-126 may be extremely large, a fast search method for the best partition strategy may be employed according to an example of the invention. More particularly, for instance, a smaller subset of the suitable block partitions may be pre-selected at any scale, instead of testing all wedge partition possibilities within a block 122-126.

According to an example, within an N×N block, an edge detection algorithm, such as, Canny, Sobel, etc., may be used, followed by a thresholding operation. This yields a two-dimensional logical array of the same size as the block indicating edges. Next, the pixels with positive response are mapped into Euclidean pixel coordinates yielding (x,y) pairs, and linear regression (based on least square error) is applied to these points. The result is a general equation of a line: y=ax+b, or x=c (when the regression is not a function). The line is converted to polar coordinates and is associated to a wedge partition. Let $(x_0, y_0)$ be the block center, N be the block size and $θ_0$ be an offset that depends on the sign of $ax_0+y_0+b$, such that $θ_0=0°$ when $ax_0+y_0+b$ is positive and $θ_0=180°$ otherwise. We then find starting points (seeds) for r and θ.

$$r_{seed} = \left| \frac{ax_0 + y_0 + b}{\sqrt{a^2 + 1}} \right|; \text{ and} \qquad \text{Equation (1)}$$

$$\theta_{seed} = \arctan(a)\frac{180°}{\pi} + \theta_0. \qquad \text{Equation (2)}$$

The regression results may be cased in x=c, to obtain:

$$r_{seed} = \left| \frac{N}{2} - c \right|; \text{ and} \qquad \text{Equation (3)}$$

$$\theta_{seed} = \theta_0, \qquad \text{Equation (4)}$$

Where $\theta_0$ is an offset that depends on the sign of N/2−c, such that $\theta_0$=90° if N/2+c>0, and $\theta_0$=270° otherwise.

From the starting seeds $r_{seed}$ and $\theta_{seed}$, a set of wedges 130a, 130b may be pre-selected by slightly changing parameters r and $\theta_0$=90° within the ranges [$r_{seed}$−Δr, $r_{seed}$+Δr] and [$\theta_{seed}$−Δθ,$\theta_{seed}$+Δθ] with increments δr and δθ, respectively.

According to another example, in certain instances, such as when there are multiple moving edges or textures within a block 122-126, a canonical quadtree partition may also be performed. In any regard, the motion estimation and partition search may be restricted to the pre-selected set of wedges, which may substantially reduce the computational requirements in searching for the wedges 130a, 130b.

The computational requirements in searching for the wedges 130a, 130b may substantially be reduced by implementing a second relatively efficient search strategy, according to a further example of the invention. The second relatively efficient search strategy comprises determining whether one of the wedges 130a, 130b for any of the blocks 122-126 has a zero motion vector. One of the wedges 130a, 130b in a pair of wedges 130a, 130b may have a zero motion vector, for instance, in situations where the video capture device is stationary and an object is moving in front of a stationary background. In these instances, the prediction errors for those wedges 130a, 130b having zero motion vectors are relatively small.

As such, the substantially optimized wedges 130a, 130b may be determined through determination of a wedge 130a, 130b that has a sufficiently small prediction error for a sufficiently large wedge. In addition, the motion vector 132 for the remaining wedge 130a, 130b may readily be computed by masked motion search, where the region of interest is defined by a binary mask that only includes those pixels in the part of a block 122-126 not included in the wedge 130a, 130b. In one regard, this example may reduce the rate for conveying the motion information because a single motion vector may be sent for a wedged block.

According to a further example, in situations where one of the wedges 130a, 130b has a zero motion vector and the prediction residual error is sufficiently small compared to a target quality, that all transform coefficients for a shape adaptive transform are quantized to zero, the wedges 130a, 130b may be treated in an analogous manner to the "SKIP" mode in traditional video coding.

According to a yet further example, the motion vector for one of the wedges 130a, 130b may be restricted to a relatively small set of motion vectors from the spatial neighborhood of the current block 122-126. In this example, the encoding would proceed as in the zero motion vector case described above, where all the possible predictor motion vectors are tested for the best wedge.

According to a further example, the prediction residual error may be quantized to 0 for the wedges 130a, 130b having zero motion vectors, to thereby reduce the rate for conveying the motion information of these wedges 130a, 130b.

With reference back to FIG. 1B, the encoder 112 may split any of the N×N blocks 122-126 into wedges 130a, 130b. The encoder 112 may furthermore perform motion estimation independently for each of the wedges 130a, 130b, thereby generating two motion vectors 132 for each of the blocks 122-126 containing the wedges 130a, 130b. As such, each of the residual errors associated with the motion vectors 132 may be coded separately or they may be combined and coded as a single residual error as described herein below.

Figure 2:
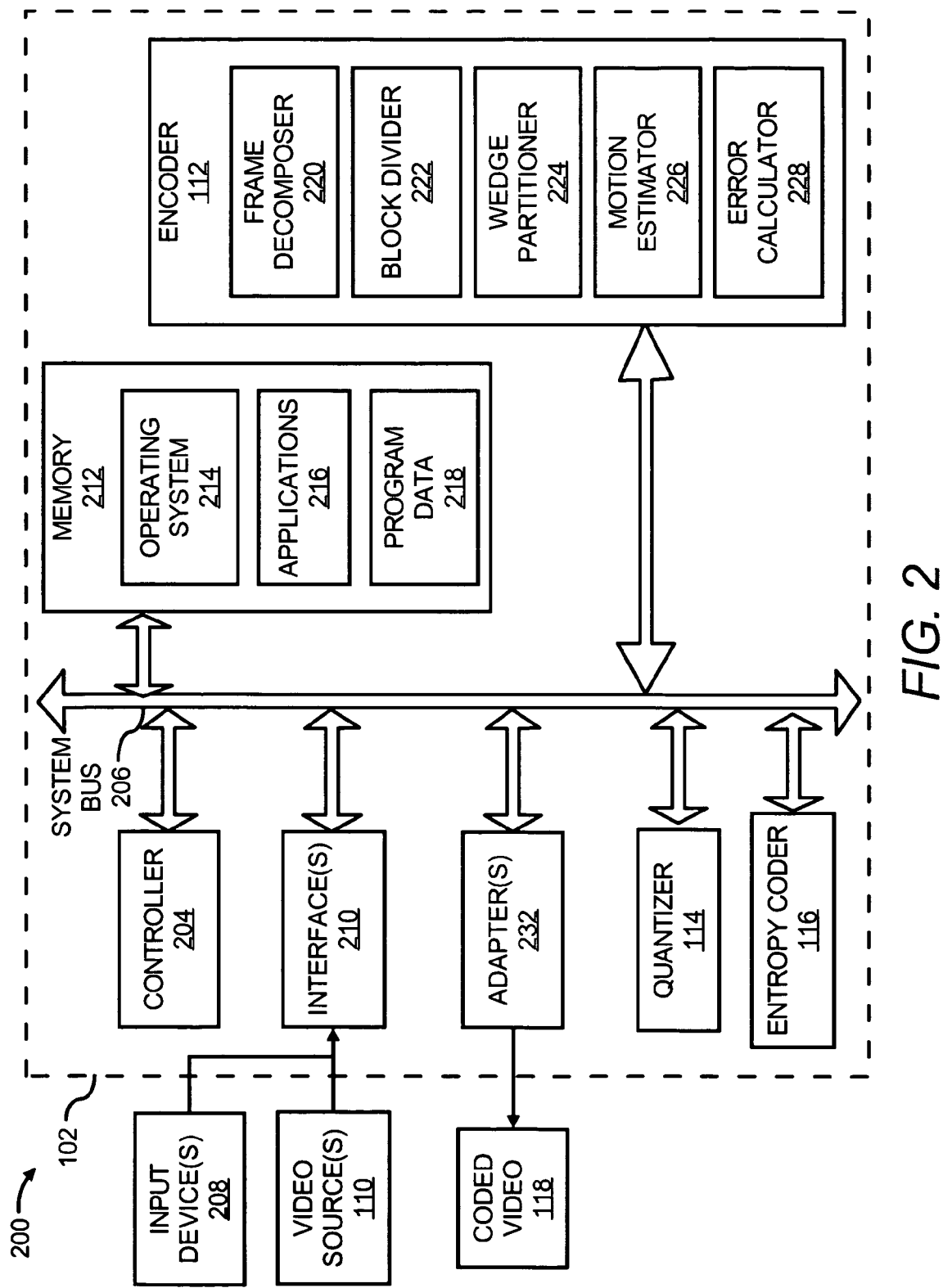
FIG. 2 is a block diagram of the video coding system depicted in FIG. 1A, in accordance with an embodiment of the invention.

Turning now to FIG. 2, there is shown a block diagram 200 of the video coding system 102, according to an example. It should be understood that the following description of the block diagram 200 is but one manner of a variety of different manners in which the video coding system 202 may be configured. In addition, it should be understood that the video coding system 202 may include additional components and that some of the components described herein may be removed and/or modified without departing from the scope of the video coding system 202.

The video coding system 102 may comprise a general computing environment and includes a controller 204 configured to control various operations of the video coding system 102. The controller 204 may comprise a microprocessor, a micro-controller, an application specific integrated circuit (ASIC), and the like. Data may be transmitted to various components of the video coding system 102 over a system bus 206 that operates to couple the various components of the video coding system 102. The system bus 206 represents any of several types of bus structures, including, for instance, a memory bus, a memory controller, a peripheral bus, an accelerated graphics port, a processor bus using any of a variety of bus architectures, and the like.

One or more input devices 208 may be employed to input information, such as, commands, instructions, data, etc., into the video coding system 102. The input devices 208 may include, for instance, a host computer, a keyboard, a mouse, a scanner, a disk drive, removable media, flash drives, and the like. Also shown is the one or more video sources 110, which may comprise an input device 208 or a separate device. The input device(s) 208 and/or the video source(s) 110 may be used, for instance, to input images, frames of images, video frames, or representations of the video images (that is, the video images in code format, which is referred to herein after as a "video image" for purposes of simplicity) to the video coding system 102. As shown, the input device(s) 208 and the video source(s) are connected to the controller 204 through an interface 210 that is coupled to the system bus 206. The input device(s) and the video source(s) 110 may, however, be coupled by other conventional interface and bus structures, such as, parallel ports, USB ports, etc. Although not shown, the interface 210 may also operate as an interface to couple the system bus 206 with other computer systems.

The controller 204 may be connected to a memory 212 through the system bus 206. Generally speaking, the memory 212 may be configured to provide storage of software, algorithms, and the like, that provide the functionality of the video coding system 102. By way of example, the memory 212 may store an operating system 214, application programs 216, program data 218, and the like. In this regard, the memory 212 may be implemented as a combination of volatile and non-volatile memory, such as DRAM, EEPROM, MRAM, flash memory, and the like. In addition, or alternatively, the memory 212 may comprise a device configured to read from and write to a removable media, such as, a floppy disk, a CD-ROM, a DVD-ROM, or other optical or magnetic media.

The controller 204 may also be connected to the encoder 112, the quantizer 114, and the entropy coder 116 through the system bus 206. In one example, the encoder 112, the quantizer 114, and the entropy coder 116 may comprise hardware composed of one or more discrete components. In addition, or alternatively, the encoder 112, the quantizer 114 and the entropy coder 116 may comprise software stored, for instance, in the memory 212. In any regard, the controller 204 may be configured to implement or invoke the encoder 112, the quantizer 114, and the entropy coder 116 to code the video content received from the video source(s) as described in greater detail herein. Although the controller 204 has been depicted and described as forming a component separate from the encoder 112, the controller 204 may form part of the encoder 112, in which the encoder 112 would include the controller 204 and its functions described herein, without departing from a scope of the encoder 112.

As shown in FIG. 2, the encoder 112 includes a frame decomposer 220, a block divider 222, a wedge partitioner 224, a motion estimator 226, and an error calculator 228. The elements 220-230 contained in the encoder 112 may comprise software modules, hardware components, or combinations thereof. The controller 204 may implement or invoke the elements 220-230 to decompose video sequence frames and to estimate motion contained in the video sequence frames.

In addition, the controller 204 may implement or invoke the quantizer 114 to quantize the coded parts of the video sequence frames and the entropy coder 116 to entropy code the coded video sequence frames. The controller 204 may, moreover, transmit or otherwise send the coded video 118 outside of the video coding system 102 through one or more adapters 232. In a first example, the coded video 118 may be sent over a network, such as, an internal network, an external network (the Internet), etc., to a another computing device. In a second example, the coded video 118 may be outputted to one or more output devices, such as, displays, printers, facsimile machines, etc.

Figure 3A:
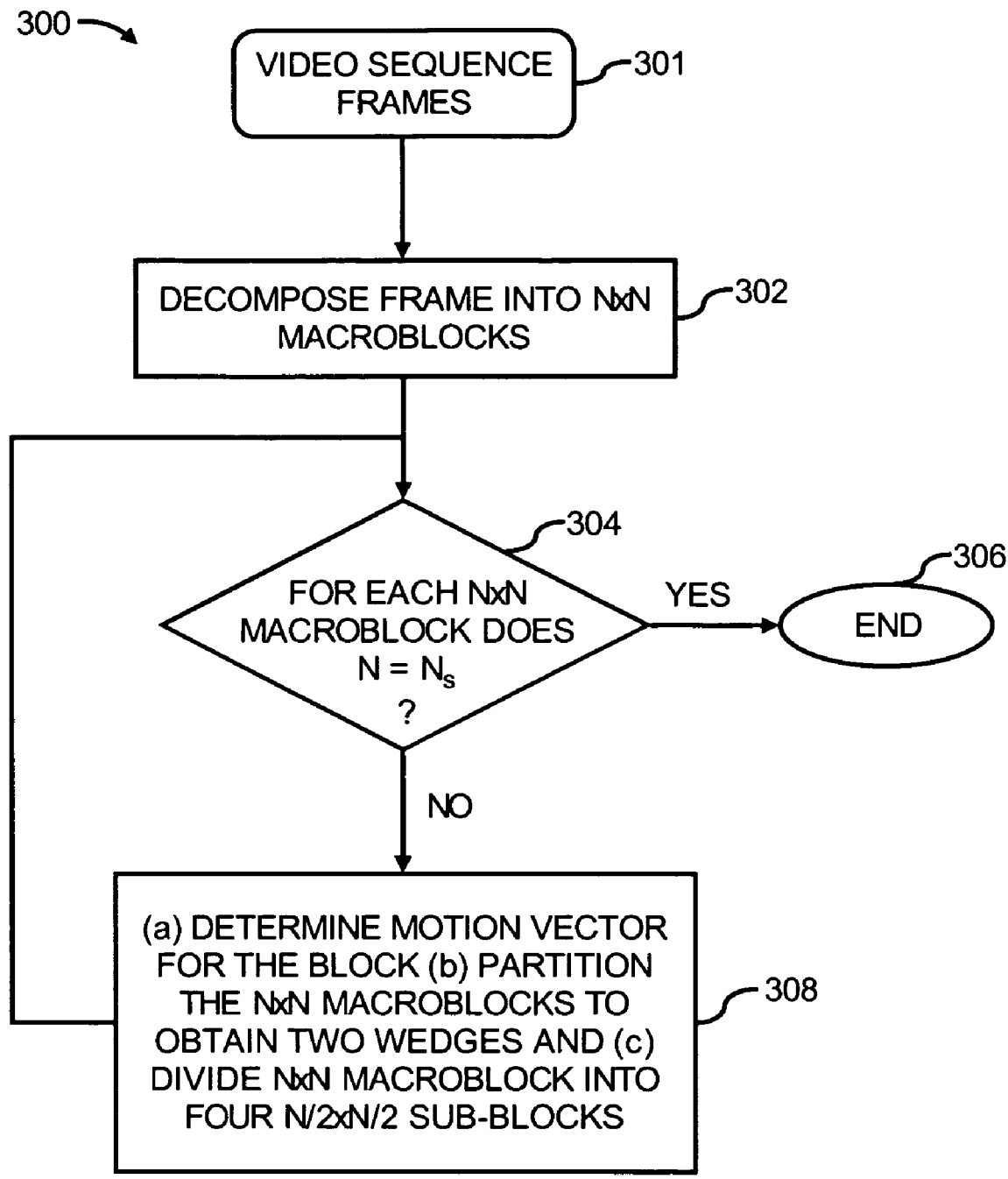
FIGS. 3A and 3B, collectively, illustrate a flow diagram of a method for decomposing a video sequence frame, according to an embodiment of the invention.

With reference now to FIG. 3A there is illustrated a flow diagram of a method 300 for decomposing a video sequence frame, according to an example. It should be apparent to those of ordinary skill in the art that the method 300 represents a generalized illustration and that other steps may be added or existing steps may be removed, modified or rearranged without departing from a scope of the method 300.

The description of the method 300 is made with reference to the block diagram 200 illustrated in FIG. 2, and thus makes reference to the elements cited therein. It should, however, be understood that the method 300 is not limited to the elements set forth in the block diagram 200. Instead, it should be understood that the method 300 may be practiced by a system having a different configuration than that set forth in the block diagram 200.

Generally speaking, the method 300 may be implemented to expand motion estimation models, such as, quadtree decompositions, to include the wedges 130a, 130b in various circumstances, and thereby enhance the one or more metrics, such as, residual errors, rate-distortion efficiencies, etc., of video codecs. In one regard, the one or more metrics may be enhanced because the wedges 130a, 130b provide relatively more accurate edge representations of moving objects.

In the method 300, the video coding system 102 may receive video content in the form of video sequence frames 301 or data representing the video sequence frames 301. At step 302, the controller 204 may invoke or implement the encoder 112, and more particularly, the frame decomposer 220, to decompose each of the video sequence frames 301 into macroblocks 122 having a first set of dimensions N×N. The frame decomposer 220 may, for instance, employ a quadtree decomposition technique to decompose the video sequence frames 301 as depicted in FIG. 1B.

At step 304, the controller 204 may invoke or implement the encoder 112, and more particularly, the frame decomposer 220, to determine whether either or both of the first set of dimensions of the macroblocks 122 are equal to a predetermined minimum dimension ($N_s$). The predetermined minimum dimension ($N_s$) may be defined as the smallest leaf level block size to which the encoder 112 is capable of decomposing the macroblock 122, which is typically 4×4 pixels.

Figure 4:
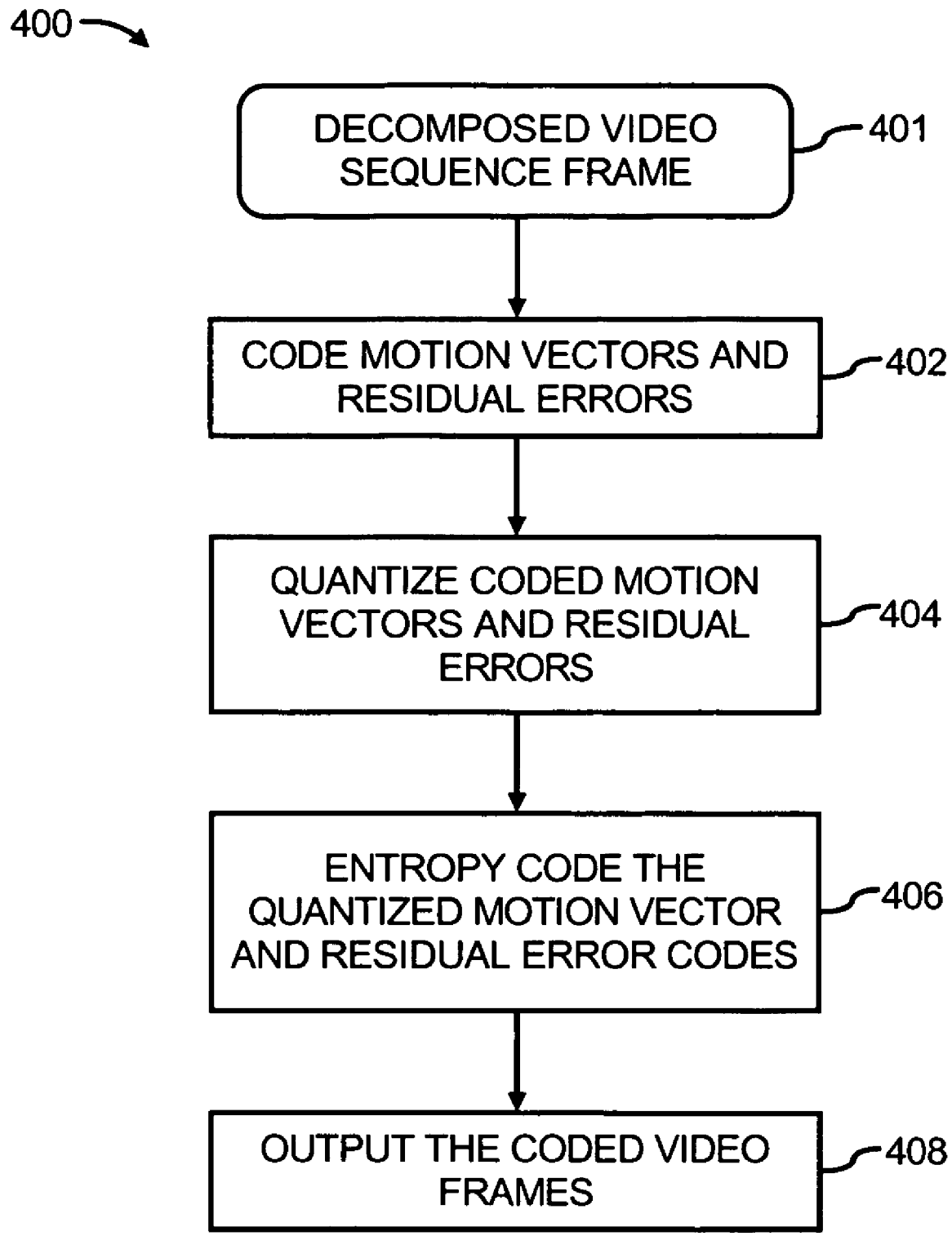
FIG. 4 depicts a flow chart of a method for processing decomposed video sequence frames, according to an embodiment of the invention.

For each of the macroblocks 122 having either or both of their first set of dimensions equal to the predetermined minimum dimension, the method 300 may end as indicated at step 306. In other words, because those macroblocks 122 have reached their smallest leaf level block sizes, they cannot be further decomposed into further sub-blocks. The macroblock 122 may, however, be further processed as indicated below with respect to the method 400 (FIG. 4).

For each of the macroblocks 122 that do not have either or both of their first set of dimensions equaling the predetermined minimum dimension, the controller 204 may invoke or implement the encoder 112, and more particularly, the motion estimator 226, to determine motion vectors for the macroblocks 122, which the controller 204 may send to a decoder, as indicated at step 308.

In addition, at step 308, the controller 204, may invoke or implement the encoder 112, and more particularly, the wedge partitioner 224, to partition those macroblocks 122 into two wedges 130a, 130b. The wedge partitioner 224 may find the best slice line 128 from a codebook of limited splices, to split the macroblock 122 into the two wedges 130a, 130b. In one example, in determining how to partition the macroblocks 122 into the wedges 130a, 130b, the wedge partitioner 224 may evaluate all possible wedge 130a, 130b combinations to determine which combination yields a substantially optimized rate-distortion efficiency. In other examples, the wedge partitioner 224 may employ one or more of the fast search methods for the best partition strategies discussed above.

According to another example, the partitioner 224 may employ a band and wedge model in partitioning a macroblock 122. When an image contains moving objects, there are likely to be two cases. Case (1): blocks 122-126 having an uncovered background in the current frame from the previous (reference) frame. Case (2): blocks that do not have an uncovered background in the current frame from the previous (reference) frame.

In Case (1), for instance, if an object is moving from left to right, this is likely to be the case for blocks falling on the left edge of the object. In this case, the partitioner 224 may employ the band-wedge model. Under the band and wedge model, two parallel lines go through a block 122-126. One wedge 130a on one side of the band has a motion vector 132 with a relatively small prediction error. The wedge 130b on the other side of the band has a different motion vector 132, but also yields a relatively small prediction error. The band in between the wedges 132a, 132b has a relatively high prediction error, because it corresponds to the uncovered background. Using the polar model discussed above for the lines, parallel lines for the band may be obtained by fixing the angle and changing only the distance from the center.

In Case (2), for instance, if an object is moving from left to right, this is likely to be the case for blocks falling on the right edge of the object. In this case, the partitioner 224 may partition the block 122-126 into two wedges 130*a*, 130*b* as discussed above.

According to an example, the background may be assumed to be stationary. In this example, one of the wedges 130*a*, 130*b* in Case 1 and Case 2 may have a zero motion vector. As such, the zero motion vector may be checked and the residual error for the block 122-126 may be compared with a threshold. If there is a sufficiently large wedge 130*a*, 130*b* where the error is zero compared to a desired encoding quality, Case (1) or Case (2) may be assumed to hold. In addition, the remainder of the block may be searched for the best motion vector. Once the best motion vector has been found, the error pattern may further be checked to determine if a parallel line beyond which the error is small may be identified. Moreover, Case (1) may be performed and the motion vector for only the non-zero motion vector wedge 130*a*, 130*b* may be sent and the band may be coded. However, if a parallel line cannot be identified, then Case (2) may be performed and the wedge 130*a*, 130*b* having the non-zero motion vector may be coded and sent.

According to a further example, If the first line partition by the zero motion vector search is known, then for every candidate motion vector searched, the wedge partitioner 224 may determine whether that motion vector should belong to Case (1) or Case (2) by noting the sign of the projection on a line perpendicular to the slice line 128, and in case of Case (1), where the parallel line should fall by the geometry, and search only around that line. This example may be performed to better decrease complexity in searching for the wedges 130*a*, 130*b*.

In addition, at step 308, the controller 204 may invoke or implement the encoder 112, and more particularly, the block divider 222, to divide the macroblocks 122 into four sub-blocks 124 having a second set of dimensions. In other words, the N×N macroblocks 122 may be divided to have N/2×N/2 dimensions. In addition, steps 304-308 may be repeated for the sub-blocks 124.

Figure 3B:
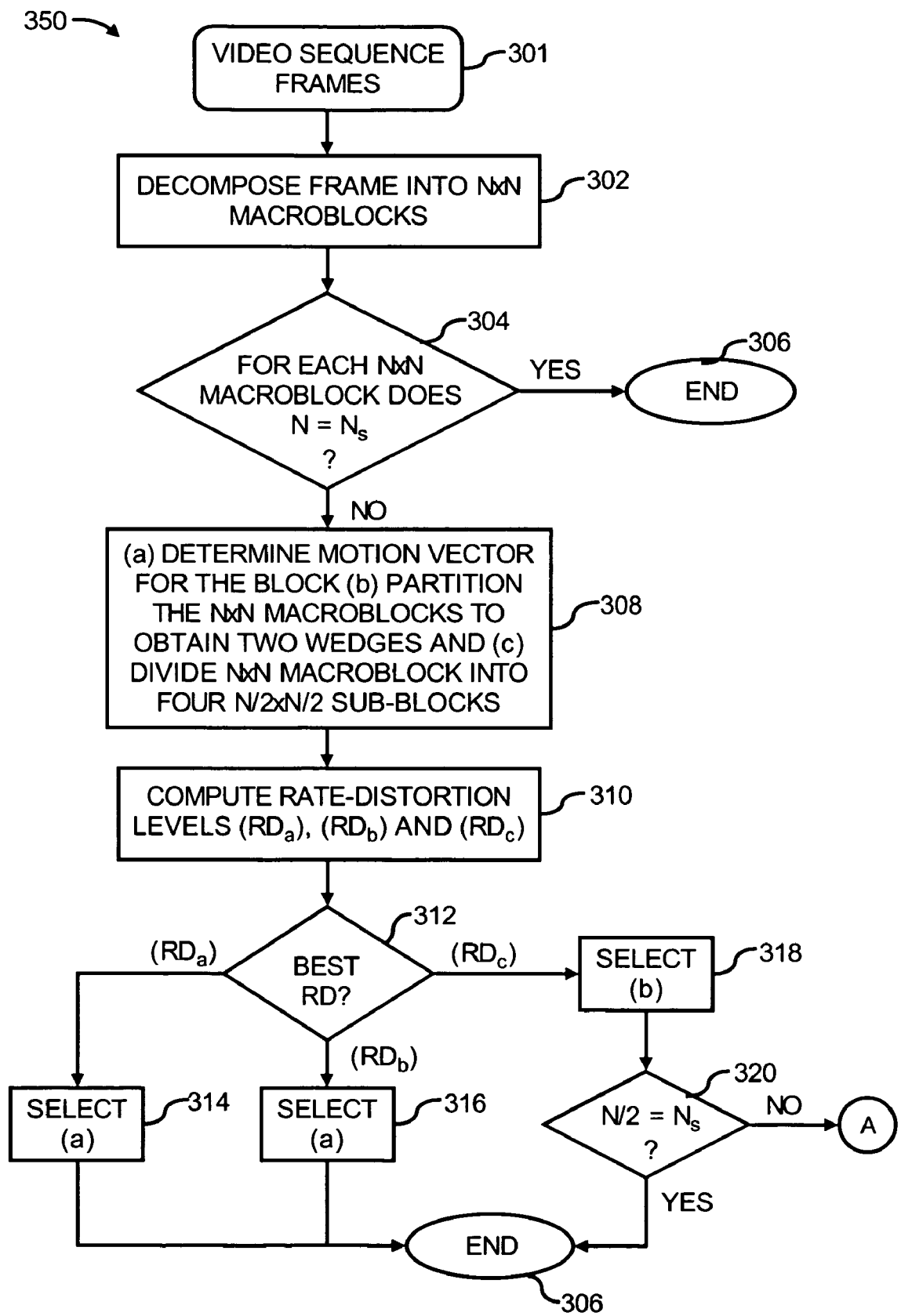
Figure 3C:
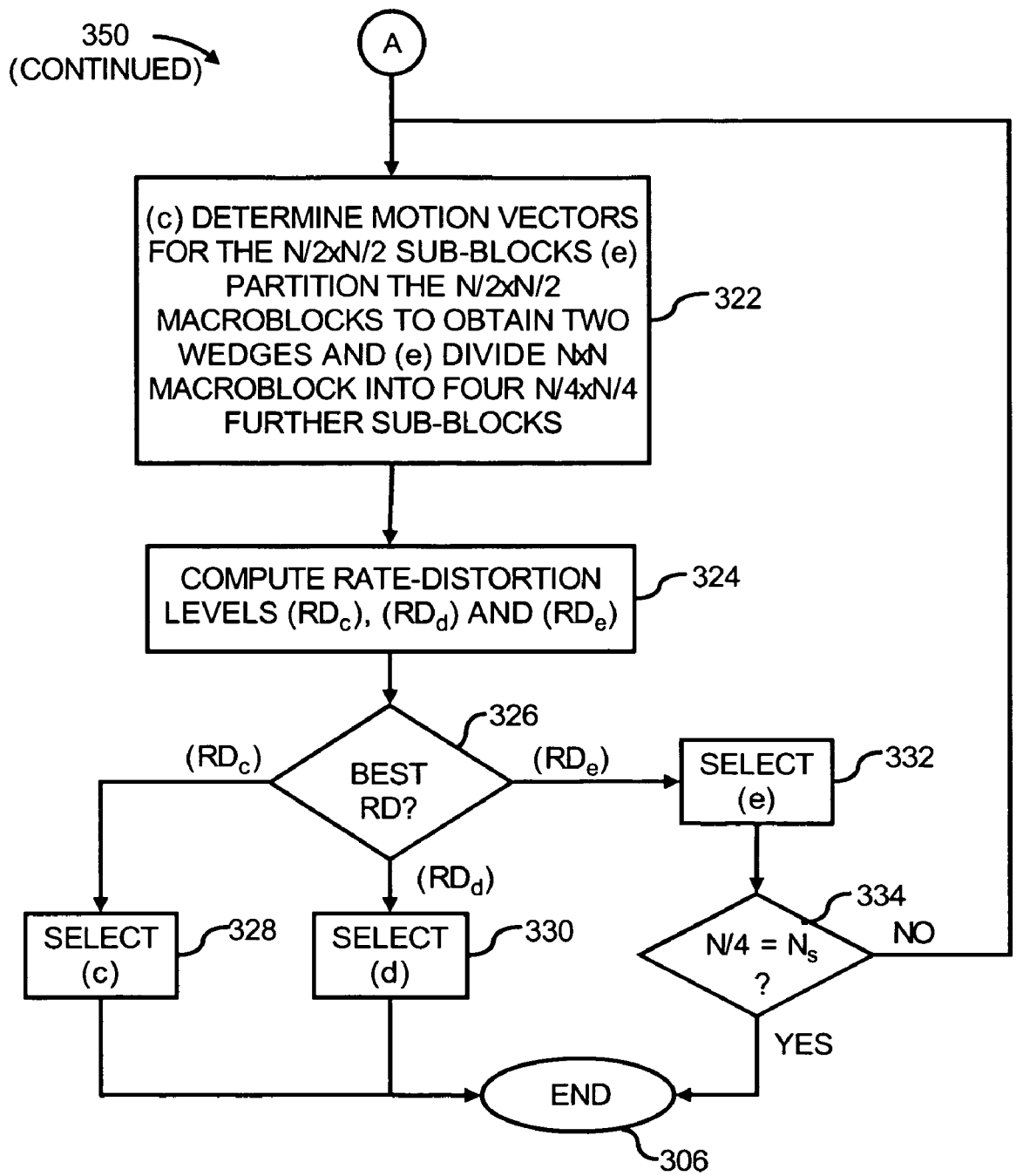

With reference now to FIGS. 3B and 3C, there are collectively illustrated a flow diagram of a method 350 for decomposing a video sequence frame, according to an example. It should be apparent to those of ordinary skill in the art that the method 350 represents a generalized illustration and that other steps may be added or existing steps may be removed, modified or rearranged without departing from a scope of the method 350.

The method 350 contains many of the steps described above with respect to the method 300 in FIG. 3A. As such, those steps are not discussed in any detail herein with respect to steps 302-308 of FIG. 3B.

In any event, at step 308, the controller 204 may invoke or implement the encoder 112, and more particularly, the motion estimator 226 and the error calculator 228, to determine the best predictor for the wedges 130*a*, 130*b*. More particularly, for instance, the motion estimator 226 may employ an inter-predictor to determine motion vectors for each of the wedges 130*a*, 130*b* based upon a reference frame. In addition, or alternatively, the motion estimator 226 may employ an intra-predictor to also determine motion vectors based upon selected pixels in neighboring blocks.

The error calculator 228 may calculate residual errors for the motion vectors predicted by both the inter-predictor and the intra-predictor and may determine which of the motion vectors has the lowest residual error. As such, at step 308, according to one example, the best wedges 130*a*, 130*b* may comprise the combination that yields the lowest residual error. According to another example, the best wedges 130*a*, 130*b* may comprise the combination of wedges 130*a*, 130*b* that yields a substantially optimized rate-distortion efficiency.

In addition, at step 308, the controller 204 may invoke or implement the encoder 112, and more particularly, the motion estimator 226 and the error calculator 228, to determine the best predictor for the sub-blocks 124. More particularly, for instance, the motion estimator 226 may employ an inter-predictor to determine motion vectors for each of the sub-blocks 124 based upon a reference frame. In addition, or alternatively, the motion estimator 226 may employ an intra-predictor to also determine motion vectors based upon selected pixels in neighboring blocks.

The error calculator 228 may calculate residual errors for the motion vectors predicted by both the inter-predictor and the intra-predictor and may determine which of the motion vectors has the lowest residual error. According to another example, the error calculator 228 may make this calculation based upon which of the motion vectors is associated with a substantially optimized rate-distortion efficiency.

The block divider 222 and the wedge partitioner 224 may employ either or both of the inter-predictor and an intra-predictor to predict the wedges 130*a*, 130*b* and the sub-blocks 124. In addition, the encoder 112 may implement different inter-predictors and intra-predictors to predict the wedges 130*a*, 130*b* and the sub-blocks 124. By way of example, the encoder 112 may implement multiple inter-predictors and intra-predictors and may select the best one for each of the wedges 130*a*, 130*b* and the sub-blocks 124. The best predictor for each of the wedges 130*a*, 130*b* and the sub-blocks 124 may comprise, for instance, the predictor that results in the lowest residual error or the best rate-distortion efficiency.

As such, at step 308, the macroblocks 122 whose first set of dimensions exceed the predetermined minimum dimension, are both partitioned into wedges 130*a*, 130*b* and divided into sub-blocks 124. In addition, motion vectors for each of the macroblocks 122 are determined, along with a residual error or rate-distortion efficiency of that motion vector. At step 310, controller 204 may invoke or implement the encoder 112 to compute rate-distortion efficiencies for the macroblock 122 motion vector ($RD_a$), wedge-partitioned macroblocks 122 ($RD_b$), and the sub-blocks 124 ($RD_c$). By way of example, the rate-distortion efficiencies may be computed through:

$$J(p)=D(p)+\lambda R(p). \qquad \text{Equation (5)}$$

In Equation (5), p refers to the overall macroblock partition strategy, while R(p) refers to the rate obtained in conveying the wedges 130*a*, 130*b*, the motion vectors, and the residual errors. In other words, R(p) refers to the bits per macroblock 122 to be conveyed. D(p) is the distortion (for instance, the mean square error (MSE), the sum-of-absolute-differences (SAD), etc.) corresponding to the partition strategy p. In addition, $\lambda$ is a Lagrangian multiplier, which may be defined as a trade-off factor between the rate and the distortion.

For compression, the encoder 112 informs the decoder which macroblock partition strategy was used in decomposing the video frame. Assuming that B(p) is the number of bits spent to encode p, and V(p) is the number of bits spent to encode the motion vectors 132 associated with partition strategy p, and the residual error compensation, $R_{res}(p)$ associated with the partition strategy p, R(p) may be defined as:

$$R(p)=V(p)+B(p)+R_{res}(p). \qquad \text{Equation (6)}$$

Generally speaking, the residual error $R_{res}(p)$ may be compressed with conventional transform based coding. Furthermore, for a fixed quantization matrix, the distortion D does not change much with the partition strategy p. Therefore, regarding D as constant, the following cost is obtained:

$$J(p)=R(p).\quad\text{Equation (7)}$$

At step 312, the controller 204 may implement or invoke the encoder 112 to compare the rate-distortion efficiencies ($RD_a$), ($RD_b$), and ($RD_c$) to substantially optimize the rate-distortion efficiency. If it is determined that the rate-distortion efficiency ($RD_a$) is the best, the controller 204 may code and send the motion vector of the macroblock 122, as indicated at step 314, and the method 350 may end as indicated at step 306. If, however, the controller 204 determines that the rate-distortion efficiency ($RD_b$) is the best, the controller 204 may select to partition the macroblocks 122 into wedges 130a, 130b, as indicated at step 316. In addition, for those macroblocks 122 that have been partitioned into wedges 130a, 130b, the method 300 may end as indicated at step 306, and those macroblocks 122 may be further processed as discussed herein below with respect to FIG. 4.

Additionally, if it is determined that the rate-distortion efficiency ($RD_c$) is the best, the controller 204 may select to divide the macroblocks 122 into sub-blocks 124, as indicated at step 318. In addition, at step 320, the controller 204 may again invoke or implement the encoder 112 to determine whether the dimensions of the sub-blocks 124 are equal to predetermined minimum dimension ($N_s$). For each of the sub-blocks 124 having either or both of their second set of dimensions equal to the predetermined minimum dimension, the method 350 may end as indicated at step 306.

As illustrated in FIG. 3C, for each of the sub-blocks 124 that do not have either or both of their second set of dimensions equaling the predetermined minimum dimension, the controller 204 may invoke or implement the encoder 112, and more particularly, the motion estimator 226, to determine motion vectors for the N/2×N/2 sub-blocks 124, which the controller 204 may send to a decoder, as indicated at step 322.

In addition, at step 322, the controller 204, may invoke or implement the encoder 112, and more particularly, the wedge partitioner 224, to partition those sub-blocks 124 into two wedges 130a, 130b. In addition, at step 322, the controller 204 may invoke or implement the encoder 112, and more particularly, the block divider 222, to divide the sub-blocks 124 into four further sub-blocks 126 having a third set of dimensions. In other words, the N/2×N/2 sub-blocks 124 may be divided to have N/4×N/4 dimensions.

As such, at step 322, the sub-blocks 124 whose second set of dimensions exceed the predetermined minimum dimension, are both partitioned into wedges 130a, 130b and divided into further sub-blocks 126, in manners as discussed above with respect to step 308. At step 324, controller 204 may invoke or implement the encoder 112 to compute rate-distortion efficiencies for sub-block 124 motion vector ($RD_c$), the wedge partitioned sub-blocks 124 ($RD_d$) and the further sub-blocks 126 ($RD_e$), in manners similar to those described above with respect to step 310.

At step 326, the controller 204 may implement or invoke the encoder 112 to compare the rate-distortion efficiencies ($RD_c$), ($RD_d$) and ($RD_e$). If it is determined that the rate-distortion efficiency ($RD_c$) is the best, the controller 204 may code and send the motion vector of the sub-block 124, as indicated at step 328. If, however, it is determined that the rate-distortion efficiency ($RD_d$) is the best, the controller 204 may select to partition the sub-blocks 124 into wedges 130a, 130b, as indicated at step 330. In addition, for those sub-blocks 124 that have been partitioned into wedges 130a, 130b, the method 350 may end as indicated at step 306.

Additionally, it if is determined that the rate-distortion efficiency ($RD_e$) is the best, the controller 204 may select to divide the sub-blocks 124 into further sub-blocks 126, as indicated at step 332. In addition, at step 334, the controller 204 may again invoke or implement the encoder 112 to determine whether the dimensions of the further sub-blocks 126 are equal to the predetermined minimum dimension ($N_s$). For each of the further sub-blocks 126 having either or both of their second set of dimensions equal to the predetermined minimum dimension, the method 350 may end as indicated at step 306.

However, for each of the further sub-blocks 126 that do not have either or both of their second set of dimensions equaling the predetermined minimum dimension, steps 322-334 may be repeated. In addition, steps 322-334 may be repeated until all of the blocks 122-126 have either reached the smallest leaf level block sizes or have been partitioned into wedges 130a, 130b.

Through implementation of the method 350 on a video sequence frame, that frame may be decomposed to include blocks 122-126 and wedges 130a, 130b having a configuration that substantially optimizes the rate-distortion efficiency of the frame.

In addition, the controller 204 may further process a plurality of decomposed video sequence frames to render the decomposed video sequence frames suitable for output, as depicted in FIG. 4.

FIG. 4, more particularly, depicts a flow diagram of a method 400 for processing decomposed video sequence frames, according to an example. It should be apparent to those of ordinary skill in the art that the method 400 represents a generalized illustration and that other steps may be added or existing steps may be removed, modified or rearranged without departing from a scope of the method 400.

At step 402, the controller 204 may invoke or implement the encoder 112 to code the motion vectors 132 and the residual errors, such as prediction errors, which were computed at steps 308 and 320. The motion vectors 132 for the blocks 122-126 and the wedges 130a, 130b may be coded through use of an appropriate transform. The residual errors for the blocks 122-126 may be coded through computation of a square block transform, yielding coefficients.

However, for the wedges 130a, 130b, the residual errors may be coded under two different options. Under the first option, the residual errors associated with the wedges 130a, 130b for a single block 122-126 may be combined into a square block and a single block transform may be computed. Under the second option, a separate shape-adaptive transform, for instance, shape adaptive DCT, may be computed for each residual error. The selection of which option to implement may also be based upon a rate-distortion efficiency optimization scheme. In other words, the controller 204 may implement the option that yields the best rate-distortion efficiency.

In instances where one of the wedges 130a, 130b of a block 122-126 has zero prediction error compared to the desired quality, various known shape-adaptive transforms, such as, shape-adaptive DCT, have been proposed. In these instances, one of the known shape-adaptive transforms may be used to code the residual error for the wedge 130a, 130b that does not have a zero prediction error. As another example, the pixels of the wedge 130a, 130b that does not have a zero prediction error may be filled by a filling algorithm and then coded as a regular block. An example of a suitable filling algorithm is one where irrelevant pixels in the wedge 130a, 130b is filled up with an average of relevant pixels.

At step 404, the controller 204 may invoke or implement the quantizer 114 to quantize the coded motion vectors and the coded residual errors, through any reasonably suitable quantization techniques. In addition, at step 406, the controller 204 may invoke or implement the entropy coder 116 to, for instance, assign codes to the quantized motion vector codes and residual error codes to match code lengths with the probabilities of the quantized motion vector codes and residual error codes, through any reasonably suitable coding technique.

The controller 204 may optionally output the coded video frames 118 to one or more output devices, as indicated at step 408. For the blocks 122-126 having wedges 130a, 130b, in instances where one of the wedges 130a, 130b has a zero motion vector, the controller 204 may transmit one bit indicating which wedge 130a, 130b has the zero motion vector and which wedge 130a, 130b has the nonzero motion vector, and may send a single motion vector, instead of two motion vectors.

Figure 5:
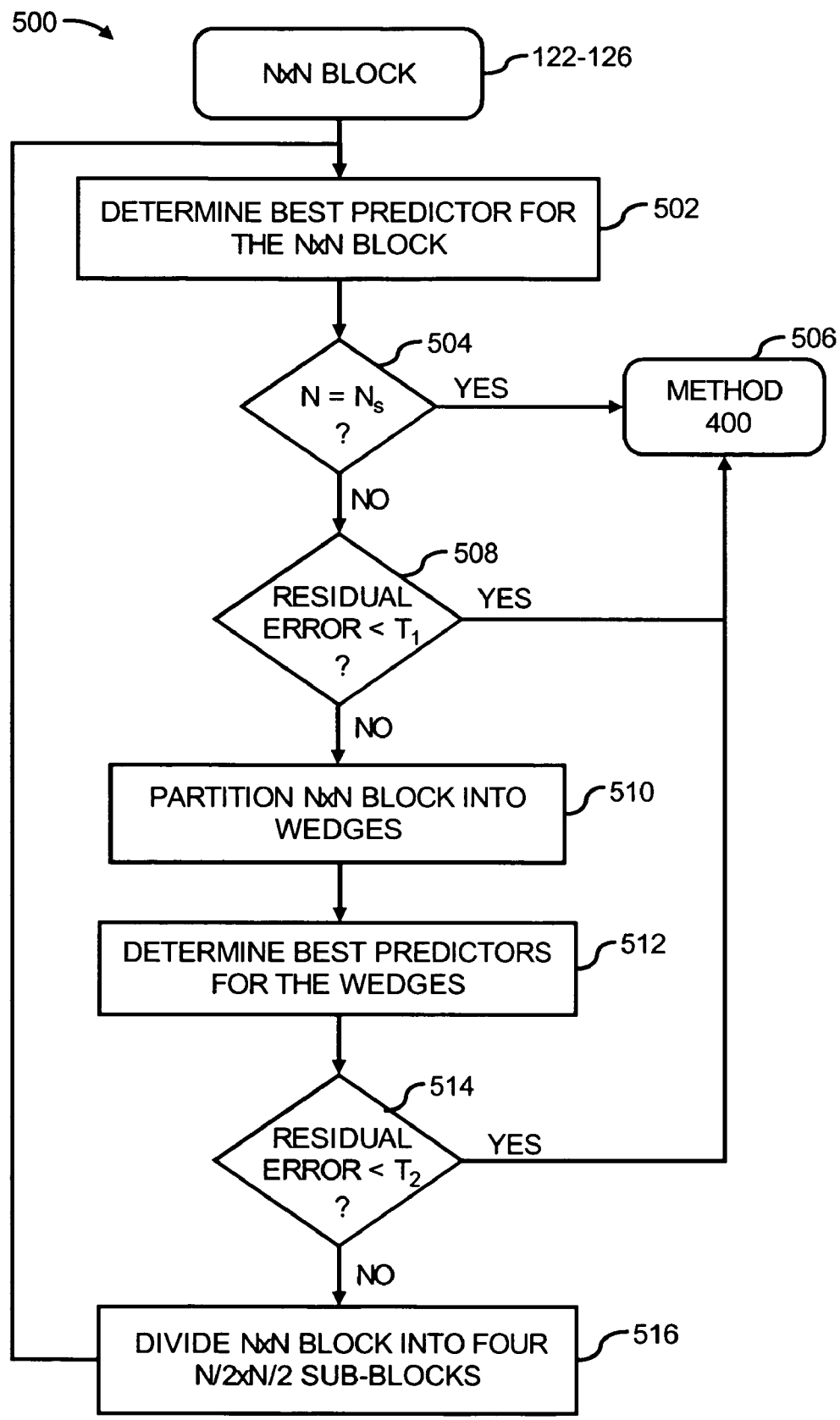
FIG. 5 illustrates a flow diagram of a method for coding a block, according to an embodiment of the invention.

With reference now to FIG. 5, there is illustrated a flow diagram of a method 500 for coding a block 122-126, according to an example. It should be apparent to those of ordinary skill in the art that the method 500 represents a generalized illustration and that other steps may be added or existing steps may be removed, modified or rearranged without departing from a scope of the method 500.

The description of the method 500 is made with reference to the block diagram 200 illustrated in FIG. 2, and thus makes reference to the elements cited therein. It should, however, be understood that the method 500 is not limited to the elements set forth in the block diagram 200. Instead, it should be understood that the method 500 may be practiced by a system having a different configuration than that set forth in the block diagram 200.

Generally speaking, similar to the method 350, the method 500 may be implemented to expand motion estimation models to include the wedges 130a, 130b in various circumstances, and thereby enhance the rate-distortion efficiencies of video codecs.

As shown in FIG. 5, the video coding system 102 may receive an N×N block 122-126. At step 502, the controller 204 may invoke or implement the encoder 112, and more particularly, the motion estimator 226 and the error calculator 228, to determine the best predictor for the N×N block 122-126. More particularly, for instance, the motion estimator 226 may employ an inter-predictor to determine a motion vector for the N×N block 122-126 based upon a reference frame. In addition, or alternatively, the motion estimator 226 may employ an intra-predictor to also determine a motion vector based upon selected pixels in neighboring blocks. The error calculator 228 may calculate residual errors for the motion vectors predicted by both the inter-predictor and the intra-predictor and may determine which of the motion vectors has the lowest residual error. As such, at step 502, according to one example, the best predictor may comprise the one that yields the lowest residual error. According to another example, the best predictor may comprise the one that yields a substantially optimized rate-distortion efficiency.

At step 504, the controller 204 may invoke or implement the encoder 112 to determine whether either or both of the dimensions of the N×N block 122-126 are equal to a predetermined minimum dimension ($N_s$). As discussed above, the predetermined minimum dimension may be defined as the dimension of the smallest leaf level block size to which the encoder 112 is capable of decomposing the block 122-126, which is typically 4×4 pixels.

At step 506, if either or both of the first set of dimensions of the N×N block 122-126 is equal to the predetermined minimum dimension ($N_s$), the motion vector and residual error of the N×N block may be coded, quantized and entropy coded as indicated in the method 400 (FIG. 4).

If, however, neither of the dimensions equals the predetermined minimum dimension ($N_s$), the controller 204 may compare the residual error determined at step 502 with a first threshold ($T_1$), as indicated at step 508. The first threshold ($T_1$) may generally be defined as a predefined level of quality sought for the motion vector prediction, which may be based, for instance, on training data that indicates which levels of residual error are acceptable. In addition, the first threshold ($T_1$) may vary for different block 122-126 sizes.

If the residual error is below the first threshold ($T_1$), step 506 may be performed. As such, the motion vector and residual error of the N×N block may be coded, quantized and entropy coded as indicated in the method 400 (FIG. 4).

If, however, the residual error exceeds the first threshold ($T_1$), the controller 204 may invoke or implement the encoder 112, and more particularly, the wedge partitioner 224, to partition the N×N block 122-126 into two wedges 130a, 130b, as indicated at step 510. The wedge partitioner 224 may find the best slice line 128 from a codebook of limited splices, to split the N×N block 122-126 into the two wedges 130a, 130b, as described above with regard to step 308 (FIG. 3A). In partitioning the N×N block 122-126 into wedges 130a, 130b, the controller 204 may invoke or implement the encoder 112, and more particularly, the motion estimator 226 and the error calculator 228, to determine the best predictor for the wedges 130a, 130b, as indicated at step 512.

More particularly, for instance, the motion estimator 226 may employ an inter-predictor to determine motion vectors for each of the wedges 130a, 130b based upon a reference frame. In addition, or alternatively, the motion estimator 226 may employ an intra-predictor to also determine motion vectors based upon selected pixels in neighboring blocks.

The error calculator 228 may calculate residual errors for the motion vectors predicted by both the inter-predictor and the intra-predictor and may determine which of the motion vectors has the lowest residual error. As such, at step 512, according to one example, the best wedges 130a, 130b may comprise the combination of wedges 130a, 130b that yields the lowest residual error. According to another example, the best predictor may comprise the combination of wedges 130a, 130b that yields a substantially optimized rate-distortion efficiency.

At step 514, the controller 204 may compare the residual error determined at step 512 with a second threshold ($T_2$), which may differ from the first threshold ($T_1$). The second threshold ($T_2$) may generally be defined as a predefined level of quality sought for the motion vector prediction, which may be based, for instance, on training data that indicates which levels of residual error are acceptable. In addition, the second threshold ($T_2$) may vary for different block 122-126 sizes.

If the residual error is below the second threshold ($T_2$), step 506 may be performed to thereby code the motion vectors and residual errors of the wedges 130a, 130b, as indicated in the method 400 (FIG. 4).

If, however, the residual error exceeds the second threshold ($T_2$), the controller 204 may invoke or implement the encoder 112, and more particularly, the block divider 222, to divide the N×N block 122 into four sub-blocks 124 having a second set of dimensions, as indicated at step 516. In other words, the N×N blocks 122 may be divided to have N/2×N/2 dimensions.

Steps 502-516 may be repeated until the block 122, or sub-blocks 124,126 thereof, have all been coded at step 506. In addition, the method 500 may be repeated for any remaining blocks 122-126.

Figure 6:
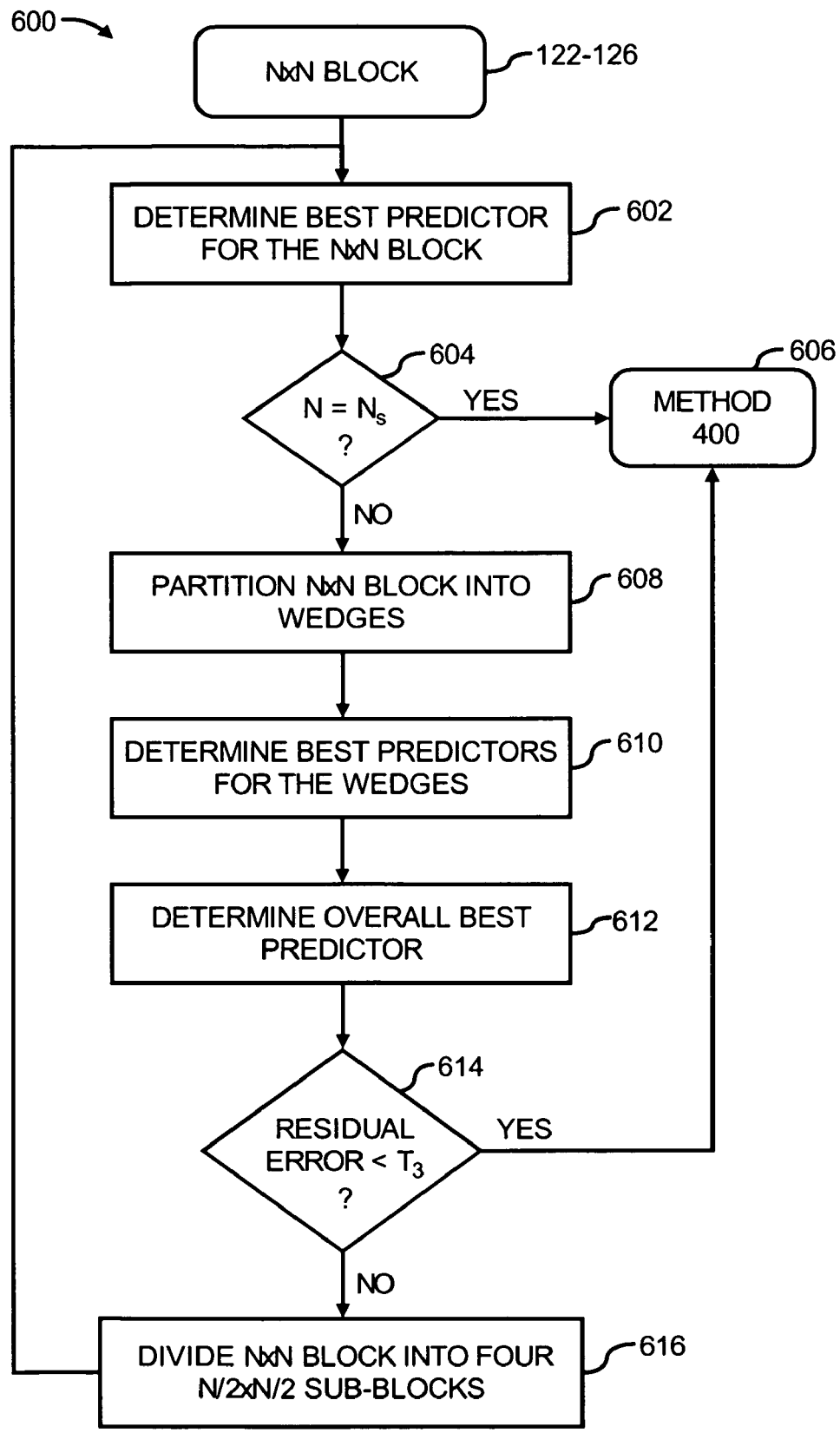
FIG. 6 illustrates a flow diagram of a method for coding a block, according to another embodiment of the invention.

Turning now to FIG. 6, there is illustrated a flow diagram of a method 600 for coding a block 122-126, according to another example. It should be apparent to those of ordinary skill in the art that the method 600 represents a generalized illustration and that other steps may be added or existing steps may be removed, modified or rearranged without departing from a scope of the method 600.

The description of the method 600 is made with reference to the block diagram 200 illustrated in FIG. 2, and thus makes reference to the elements cited therein. It should, however, be understood that the method 600 is not limited to the elements set forth in the block diagram 200. Instead, it should be understood that the method 600 may be practiced by a system having a different configuration than that set forth in the block diagram 200.

Generally speaking, similar to the method 500, the method 600 may be implemented to expand motion estimation models to include the wedges 130a, 130b in various circumstances, and thereby enhance the rate-distortion efficiencies of video codecs.

As shown in FIG. 6, the video coding system 102 may receive an N×N block 122-126. At step 602, the controller 204 may invoke or implement the encoder 112, and more particularly, the motion estimator 226 and the error calculator 228, to determine the best predictor for the N×N block 122-126, as discussed above with respect to step 502 in FIG. 5.

At step 604, the controller 204 may invoke or implement the encoder 112 to determine whether either or both of the dimensions of the N×N block 122-126 are equal to a predetermined minimum dimension ($N_s$), as discussed above with respect to step 504 in FIG. 5. In addition, at step 606, if either or both of the first set of dimensions of the N×N block 122-126 is equal to the predetermined minimum dimension ($N_s$), the motion vector and residual error of the N×N block may be coded, quantized and entropy coded as indicated in the method 400 (FIG. 4).

If, however, neither of the dimensions equals the predetermined minimum dimension ($N_s$), the controller 204 may invoke or implement the encoder 112, and more particularly, the wedge partitioner 224, to partition the N×N block 122-126 into two wedges 130a, 130b, as indicated at step 608. The wedge partitioner 224 may find the best slice line 128 from a codebook of limited splices, to split the N×N block 122-126 into the two wedges 130a, 130b, as described above with regard to step 308 (FIG. 3A) and step 510 (FIG. 5). In partitioning the N×N block 122-126 into the wedges 130, 130b, as indicated at step 610, the controller 204 may invoke or implement the encoder 112, and more particularly, the motion estimator 226 and the error calculator 228, to determine the best predictor for the wedges 130a, 130b and the residual errors for the motion vectors, as discussed above with respect to step 512 (FIG. 5).

At step 612, the controller 204 may invoke or implement the encoder 112 to determine which of the predictors found in step 602 and in step 610 is the overall best predictor. That is, the controller 204 may determine which of the predictors yields either or both of the lowest residual error and the highest rate-distortion efficiency. In performing this comparison, the controller 204 may add a penalty factor to the residual error resulting from the prediction performed on the wedges 130a, 130b because blocks 122-126 that have been partitioned into wedges 130a, 130b typically require a greater number of bits when they are encoded. The penalty factor may be defined, for instance, in an ad hoc manner based upon training, which may be developed through testing of various penalty factors and associated residual errors.

At step 614, the controller 204 may compare the residual error resulting from the overall best predictor determined at step 612 with a third threshold ($T_3$), which may differ from the first threshold ($T_1$) and the second threshold ($T_1$) discussed with respect to FIG. 5. The third threshold ($T_3$) may generally be defined as a predefined level of quality sought for the motion vector prediction, which may be based, for instance, on training data that indicates which levels of residual error are acceptable. In addition, the third threshold ($T_3$) may vary for different block 122-126 sizes.

If the residual error is below the third threshold ($T_3$), step 606 may be performed to thereby code the motion vectors and residual errors of the wedges 130a, 130b, as indicated in the method 400 (FIG. 4).

If, however, the residual error exceeds the third threshold ($T_3$), the controller 204 may invoke or implement the encoder 112, and more particularly, the block divider 222, to divide the N×N block 122 into four sub-blocks 124 having a second set of dimensions, as indicated at step 616. In other words, the N×N blocks 122 may be divided to have N/2×N/2 dimensions.

Steps 602-616 may be repeated until the block 122, or sub-blocks 124,126 thereof, have all been coded at step 606. In addition, the method 600 may be repeated for any remaining blocks 122-126.

Some or all of the operations illustrated in the methods 300, 350, 400, 500, and 600 may be contained as a utility, program, or a subprogram, in any desired computer accessible medium. In addition, the methods 300, 350, 400, 500, and 600 may be embodied by computer programs, which may exist in a variety of forms both active and inactive. For example, they may exist as software program(s) comprised of program instructions in source code, object code, executable code or other formats. Any of the above may be embodied on a computer readable medium, which include storage devices and signals, in compressed or uncompressed form.

Exemplary computer readable storage devices include conventional computer system RAM, ROM, EPROM, EEPROM, and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that any electronic device capable of executing the above-described functions may perform those functions enumerated above.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the scope of the invention, which is intended to be defined by the following claims—and their equivalents—in which all terms are meant in their broadest reasonable sense unless otherwise indicated.

What is claimed is:

1. A method for decomposing a video sequence frame, wherein the video sequence frame is represented by a plurality of blocks, said method comprising:
using a processor to perform the steps of:

for at least one block of the plurality of blocks,
(a) determining whether either or both of the dimensions of the at least one block equal a predetermined minimum dimension;
(b) in response to either or both of the dimensions equaling the predetermined minimum dimension, sending a motion vector for the block;
(c) in response to both of the dimensions exceeding the predetermined minimum dimension,
 (i) determining a motion vector for the block;
 (ii) partitioning the block into two wedges, wherein each of the wedges is associated with a different motion vector;
 (iii) dividing the block into four N/2×N/2 sub-blocks; and
 (iv) repeating steps (a)-(c) on each of the four N/2× N/2 sub-blocks until either or both of the dimensions equal the predetermined minimum dimension.

2. The method according to claim 1, wherein partitioning the block into wedges further comprises restricting the partitioning of the blocks into wedges to a pre-selected selected set of wedges, wherein the pre-selected set of wedges comprises a subset of all possible wedge partitions in the block, to thereby substantially reduce computational requirements associated with searching for the wedges.

3. The method according to claim 1, wherein partitioning the block into wedges further comprises partitioning the block into two wedges such that one of the two wedges has a zero motion vector.

4. The method according to claim 3, wherein the motion vectors of the wedges contain residual errors, said method further comprising:
quantizing the residual error of the wedge containing the zero motion vector to zero, to thereby reduce the rate for conveying the motion vectors of the wedges.

5. The method according to claim 1, wherein partitioning the block into wedges further comprises restricting the motion vectors for each of the wedges to a relatively small set of motion vectors from a spatial neighborhood of the block to thereby reduce computational requirements associated with searching for the wedges.

6. The method according to claim 1, wherein partitioning the block into wedges further comprises partitioning the block into two wedges and a parallel band of variable thickness between the two wedges, wherein each of the two wedges and the parallel band are associated with different motion vectors.

7. The method according to claim 6, wherein partitioning the block into two wedges and a parallel band of variable thickness between the two wedges further comprises partitioning the block such that at least one of the two wedges and the parallel band has a zero motion vector.

8. The method according to claim 7, wherein the motion vectors of the wedges and the zero motion vector contain residual errors, said method further comprising:
quantizing the residual error of the at least one of the wedges and the parallel band containing the zero motion vector to zero, to thereby reduce the rate for conveying the motion vectors of the wedges and the parallel band.

9. The method according to claim 6, wherein partitioning the block into two wedges and a parallel band of variable thickness between the two wedges further comprises restricting the motion vectors for each of the wedges and the parallel band to a relatively small set of motion vectors from a spatial neighborhood of the block to thereby reduce computational requirements associated with searching for the wedges and the parallel band.

10. The method according to claim 1, further comprising:
in response to step (c), determining which of steps (i)-(iv) yields the lowest efficiency metric, wherein determining which of steps (i)-(iv) yields the lowest efficiency metric comprises:
 (d) calculating a first metric of the motion vector determined at step (i);
 (e) calculating a second metric of motion vectors resulting from partitioning the block into wedges at step (ii);
 (f) calculating a third metric of motion vectors of the sub-blocks resulting from dividing the block into the sub-blocks at steps (iii) and (iv); and
 (g) determining which of steps (d)-(f) yields the lowest efficiency metric, wherein the efficiency metric comprises at least of a residual error level and a rate-distortion efficiency; and
performing one of the steps (i)-(iv) having the lowest efficiency metric.

11. The method according to claim 1, wherein step (c) further comprises:
(d) finding a first optimized predictor for the block, wherein implementation of the optimized predictor yields a first residual error;
(e) comparing the first residual error with a first threshold, said first threshold comprising a predefined level of quality;
(f) coding at least one motion vector of the block and the first residual error in response to the first residual error falling below the first threshold;
(g) implementing step (i) in response to the first residual error falling below the first threshold;
(h) finding a second optimized predictor for the wedges, wherein implementation of the second optimized predictor yields a second residual error;
(j) comparing the second residual error with a second threshold, said second threshold comprising a predefined level of quality;
(k) coding the motion vectors of the wedges and the second residual error in response to the second residual error falling below the second threshold; and
wherein dividing the block into the sub-blocks at step (iii) further comprises dividing the block in response to the second residual error exceeding the second threshold, the method further comprising:
repeating steps (e)-(h), (j), and (k) for each of the sub-blocks.

12. The method according to claim 1, further comprising:
(d) finding a first optimized predictor for the block, wherein implementation of the optimized predictor yields a first residual error;
(e) finding a second optimized predictor for the wedges, wherein implementation of the second optimized predictor yields a second residual error;
(f) determining which of the first residual error and the second residual error is lower;
(g) comparing the lower residual error with a threshold, said threshold comprising a predefined level of quality; and
(h) one of partitioning the block into wedges at step (ii) and dividing the block into sub-blocks at step (iii) associated with the lower residual error in response to the lower residual error falling below the threshold.

13. The method according to claim 12, wherein dividing the block into the sub-blocks at step (d) further comprises dividing the block in response to the lower residual error exceeding the threshold, the method further comprising:
repeating steps (d)-(h) for each of the sub-blocks.

14. The method according to claim 1, wherein partitioning the block into wedges at step (ii) yields a residual error for each of the wedges, the method further comprising:
one of,
combining the residual errors into a square block and coding the square block through use of a single block transform; and
coding the residual errors using two separate shape-adaptive transforms.

15. An encoder for encoding a video sequence frame, wherein the video sequence frame is represented by a plurality of blocks having a first set of dimensions, said encoder comprising:
a wedge partitioner;
a block divider;
a motion estimator; and
an error calculator configured to calculate a first metric of the motion vectors associated with partitioning the at least one block into two wedges and to calculate a second metric of the motion vectors associated with dividing the at least block into sub-blocks, and
for at least one block, wherein a controller is configured (a) to determine whether either both of the dimensions of the at least one block equal a predetermined minimum dimension, (b) to implement the motion estimator to estimate a motion vector for the at least one block in response to the either or both of the dimensions equaling the predetermined minimum dimensions, and in response to both of the dimensions exceeding the predetermined minimum dimension, (c) to implement the motion estimator to estimate a motion vector for the at least one block, (d) to implement the wedge partitioner to partition the at least one block of the plurality of blocks into two wedges, (e) to implement the block divider to divide the at least one block into sub-blocks having a second set of dimensions, and to perform (a)-(e) for each of the sub-blocks.

16. The encoder according to claim 15, wherein the controller is further configured to restrict the partitioning of the blocks into wedges into a pre-selected set of wedges, wherein the pre-selected set of wedges comprises a subset of all possible wedge partitions in the block, to thereby substantially reduce computational requirements associated with searching for the wedges.

17. The encoder according to claim 15, wherein the controller is further configured to implement the wedge partitioner to partition the block into two wedges, such that one of the two wedges has a zero motion vector.

18. The encoder according to claim 15, wherein the controller is further configured find a first optimized predictor for the block, wherein the first optimized predictor is configured to yield a first residual error, to compare the first residual error with a first threshold, to find a second optimized predictor for the wedges in response to the first residual error falling below the first threshold, to compare the second residual error with a second threshold, and wherein the controller is further configured to divide the block into sub-blocks in response to the first residual error exceeding the first threshold and to partition the block into the wedges in response to the second residual error exceeding the second threshold.

19. The encoder according to claim 15, wherein the controller is further configured to find a first optimized predictor for the block, wherein the first optimized predictor is configured to yield a first residual error, to find a second optimized predictor for the wedges, wherein the second optimized predictor is configured to yield a second residual error, to determine which the first residual error and the second residual error is lower, to compare the lower residual error with a threshold, and to one of partition the block into wedges and divide the block into sub-blocks associated with the lower residual error in response to the lower residual error falling below the threshold.

20. A non-transitory computer readable storage medium on which is embedded one or more computer programs, said one or more computer programs implementing a method for decomposing a video sequence frame, wherein the video sequence frame is represented by a plurality of blocks, said one or more computer programs comprising a set of instructions for:
determining whether either or both of the dimensions of each of the plurality of blocks equal a predetermined minimum dimension;
for those blocks in which either or both of the dimensions equal the predetermined minimum dimension, sending a motion vector for the block;
for those blocks in which both of the dimensions exceed the predetermined minimum dimension,
determining a motion vector for the block;
partitioning the block into two wedges, wherein each of the wedges is associated with a different motion vector;
dividing the block into four N/2×N/2 sub-blocks; and
repeating steps (a)-(c) on each of the four N/2×N/2 sub-blocks until either or both of the dimensions equal the predetermined minimum dimension.

* * * * *

UNITED STATES PATENT AND TRADEMARK OFFICE
CERTIFICATE OF CORRECTION

| | |
|---|---|
| PATENT NO. | : 7,756,348 B2 |
| APPLICATION NO. | : 11/589447 |
| DATED | : July 13, 2010 |
| INVENTOR(S) | : Debargha Mukherjee et al. |

It is certified that error appears in the above-identified patent and that said Letters Patent is hereby corrected as shown below:

In column 17, line 23, in Claim 2, after "pre-selected" delete "selected".

In column 20, line 4, in Claim 18, after "configured" insert -- to --.

Signed and Sealed this
Twenty-seventh Day of March, 2012

David J. Kappos
*Director of the United States Patent and Trademark Office*